United States Patent [19]
Caniz

[11] 3,747,659
[45] July 24, 1973

[54] TIRE STUD
[75] Inventor: Rolf J. Caniz, Grove City, Pa.
[73] Assignee: Kennametal Inc., Latrobe, Pa.
[22] Filed: Aug. 30, 1971
[21] Appl. No.: 175,964

[52] U.S. Cl. .............................................. 152/210
[51] Int. Cl. .............................................. B60c 11/16
[58] Field of Search ................................... 152/210

[56] References Cited
UNITED STATES PATENTS
2,627,888   2/1953   Bull .................................. 152/210
3,545,515   12/1970  Gottauf ............................ 152/210

Primary Examiner—James B. Marbert
Attorney—Melvin A. Crosby

[57] ABSTRACT

The specification discloses a tire stud in which a body with a head on one end has an axial hole extending into the body at the other end in which a hard wear resistant pin is mounted so as to project slightly from the stud body at the end opposite the head. The bore in which the pin is seated presents a discontinuous surface in the axial direction so that as the body wears off at the outer end the pin will migrate inwardly into the stud body and maintain a substantially uniform small protrusion from the outer end of the stud body throughout the life of the stud.

10 Claims, 3 Drawing Figures

PATENTED JUL 24 1973　　3,747,659

INVENTOR.
ROLF J. CANTZ
BY

TIRE STUD

The present invention relates to tire studs and is particularly concerned with an improved stud construction in which the protrusion of a hard wear resistant pin in the stud body is controlled.

Tire studs are well known and most, if not all, of the studs presently used take the form of a substantially cylindrical body part with a flange-like head at one end with a hard water resistant pin inserted into the body at the other end and protruding slightly therefrom.

Such studs are inserted in blind holes in the tread of the tire, head end foremost, with not more than a slight protrusion of the cylindrical shank of the body from the surface of the tire tread. With studs mounted in a tire tread in the aforementioned manner, preferably in the form of two or more rows on each side of the zenith portion of the tire tread, when the tire rolls on a roadway, the protruding outer ends of the studs, and the hard pins mounted therein, will be resiliently pressed against a roadway and will enhance the tractive effort of the tire under any circumstances wherein the surface of the roadway can be penetrated to any degree by the outer end of the stud.

A roadway, for example, might have hard packed snow or ice thereon and the outer end of the stud will penetrate such formations and substantially increase the tractive efforts of the tire on such a surface.

Since the tire tread will wear down in the radial direction as the tire is used, it is important for the outer end of the studs in the tire to wear down at about the same rate so as to maintain substantially constant protrusion of the studs from the tire throughout the life of the studs.

The stud body readily wears off at the same rate as the tire tread material and by properly selecting the composition of the hard wear resistant pin, usually a cemented carbide material, it can also be caused to wear off at about the same rate as the tread rubber, whereby the stud maintains substantially constant protrusion throughout the life of the tire.

However, tread materials vary as to wearing characteristics, and identical tires will vary as to wear rate, depending upon the driver of the vehicle. Thus, there is no practical way of always matching the wear rate of a stud to that of the tire in which it is mounted, and the problem has presented itself, on occasion, of excessive protrusion of the hard wear resistant pins from the tire tread.

When pins protrude in excessive amounts from the outer ends of the stud bodies, the studs deflect substantial amounts when they engage the roadway and this will cause the studs to loosen in the tread and will also permit abrasive material to enter the holes in which the studs are mounted which will cause excessive wear on the peripheral portion of the stud bodies, leading to loosening of the studs in the tire tread.

It is, thus, of considerable advantage, not only in respect of the effectiveness of the stud, but also in respect of road wear and permanence of the studs in the tire to prevent excessive protrusion of the pins from the tire bodies.

In previously filed United States application serial Nos. 85,097 and 120,210, filed Oct. 29, 1970, and Mar. 2, 1971, respectively, both in the name of Rolf J. Cantz, and both assigned to the same assignee as the present application, there are disclosed novel stud designs in which the hard wear resistant pin in the stud body is adapted to migrate axially inwardly into the stud body as the body wears away.

In these previous applications, the inward migration of the pin is accomplished by fitting a tapered pin carefully into a stud body and by selecting the interengaging lengths of the pin and body such that, as the stud body wears away and the support of the pin decreases, the impact with which the stud engages a roadway as the tire rolls on the roadway is sufficient to cause inward movement of the pin into the body, thereby to maintain a more or less constant protrusion of the pin from the body throughout the life of the tire stud.

While the studs according to the prior applications operate satisfactorily, extremely close manufacturing tolerances are required to cause reliable inward migration of the pins into the stud body. If the pins migrate into the body too freely, protrusion can be lost entirely, and if the pins migrate into the body too slowly, excessive protrusion and the difficulties attendant thereto will result.

Thus, in practice, studs according to the prior patent applications referred to above have been somewhat difficult to produce in quantity while exhibiting uniform characteristics.

With the foregoing in mind, a primary objective of the present invention is the provision of a stud arrangement in which the hard wear resistant pin of the stud migrates inwardly into the stud body in a reliable manner as the body wears away.

Another object of this invention is the provision of a stud of the aforementioned type which is relatively inexpensive to manufacture.

These and other objects and advantages of the present invention will become more apparent upon reference to the following detailed specification taken in connection with the accompanying drawings in which.

BRIEF SUMMARY OF THE INVENTION

According to the present invention, a tire stud is provided which has an axial hole through the center of the body and which hole presents a supporting surface for the stud pin which is interrupted in the axial direction along any line.

The axially discontinuous stud supporting surface can be obtained by forming a rather coarse thread inside the bore or by forming a threaded or convoluted tubular element which is mounted in the tire stud on the axis thereof as, for example, by forming the tubular element from metal and encasing it within a plastic material which forms, with the element, a stud body in which the tire stud pin is mounted.

DETAILED DESCRIPTION OF THE INVENTION

Figure 1:
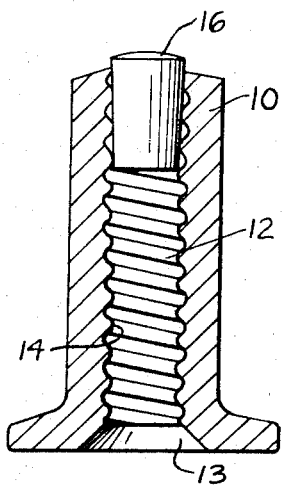
FIG. 1 is a vertical section through a tire stud constructed according to the present invention having a metal body with a thread formed therein for supporting the pin of the tire stud.

Referring to the drawings somewhat more in detail, FIG. 1 shows a tire stud consisting of a tubular metallic body 10 having a single flanged head 11 at one end. The stud body is formed with an axial bore 12, preferably extending completely therethrough, and terminating at the head end in a flared region 13.

The bore 12, according to the present invention, is provided with a rather coarse rope-like thread 14 and mounted in the bore at the end of the stud body opposite head 11 is a tapered pin 16 of hard wear resistant material such as cemented carbide, for example, tungsten carbide or titanium carbide or a mixture of carbides cemented together by a suitable binder metal according to conventional practices.

Figure 3:
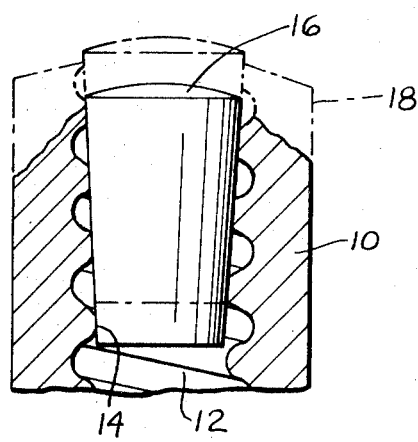
FIG. 3 is a fragmentary view drawn at enlarged scale showing the manner in which the stud body of FIG. 1 operates to control the protrusion of the pin from the outer end of the stud body.

It will be apparent from FIG. 1 and, from FIG. 3, which is a fragmentary view of the FIG. 1 modification drawn at enlarged scale, that the hard wear resistant pin engages a certain number of the peaks of the thread 14 formed inside the stud body and thus is supported against inward movement into the stud body with a predetermined force.

However, as the stud body wears down at the outer end, the thread formed in the bore in the stud body provides for weakening of the stud body so that it will tend to break off, or wear off rapidly, as shown at 18 in FIG. 3. This breaking off of the outer end of the stud body, or the rapid abrading away of the stud body, in the weakened regions thereof, brings about a substantial decrease in the amount of support provided for pin 16 so that the pin will migrate inwardly into the stud body until it has about the same protrusion from the stud body as it originally had.

By providing the support for the pin in the disclosed manner, the pin can be caused to migrate into the stud gradually as the body wears off thereby maintaining substantially constant protrusion throughout the life of the stud.

Since, as mentioned, the outer end of the stud body will wear away at about the same rate as the tread rubber, it follows that the pin will protrude outwardly from the surface of the tread about the same amount throughout the life of the stud in the tire.

Figure 2:
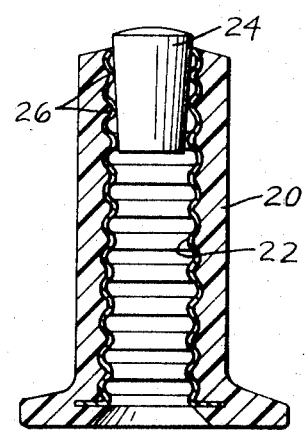
FIG. 2 is a view like FIG. 1 but shows a stud body formed of plastic material with a metal liner therein which is corrugated or formed to a thread form.

FIG. 2 shows a modification wherein the stud body is generally indicated at 20 and which is provided on the axis thereof with a metallic insert member 22 which is either corrugated, or threaded, to provide peaks 26 which engage the tapered pin 24 and support the pin.

The body 20, in the modification of FIG. 2, may be a plastic material, such as a fiberglass reinforced plastic with the plastic material itself comprising a material such as Teflon, or Delrin, or the like. With the FIG. 2 modification, if the tubular insert 22 is formed with annular grooves, as shown, each time the stud body wears down to the point that a peak is worn off the tubular insert member, there will be a sudden reduction in the support provided for the pin, and it will migrate inwardly in the stud body till the original degree of support provided therefor by the stud body is restored.

In either of the described modifications, the pin can be relatively short and the protrusion thereof from the stud body is maintained substantially constant. Due to the fact that there are rather large changes in the degree of support provided for the pin as the stud body wears away, manufacturing tolerances are not nearly so critical as in respect of the stud according to the previously filed applications identified above and the studs can thus be made in large volume and will have reliable and substantially uniform characteristics.

Furthermore, the studs adapt themselves to any type of tread and to any type of driver so that careful matching of the studs to the tread material is no longer required.

By way of a specific example, a typical tire stud pin might be from about 0.070 to 0.120 inches in diameter at the larger end and tapers inwardly toward the bottom at an included angle of from about 4° to about 12°. In length, the pin can be from about 0.200 to 0.300 inches and the desired protusion thereof from the end of the stud body ranges from 0.020 to about 0.040 inches.

The diameter of the bore in the stud body which has been found suitable is selected so that the pin is firmly seated in the body when the larger end has about the degree of protrusion referred to. Thus, the smallest diameter of the bore, namely, across the peaks of the threads or corrugations therein might vary from about 0.060 to about 0.110 inches in diameter.

Modifications may be made within the purview of the appended claims.

What is claimed is:

1. In a tire stud; a body having a cylindrical shank and a flange-like head on one end, said body having an axial bore extending therein from the end opposite the head, a smooth surfaced tapered pin of hard wear resistant material press fitted small end foremost into said bore with an interference fit and protruding from the bore at the end of the body opposite the head a distance which is a small fraction of the length of the pin, said bore when viewed in axial cross section comprising alternate peaks and valleys distributed therealong in the axial direction and curvilinear in axial cross section, the maximum and minimum diameters of said bore being substantially constant throughout the length of said bore and the said minimum diameter of said bore being about equal to the smallest diameter of said pin while the maximum diameter of said bore is greater than the larger diameter of said pin, the force required to press said pin into said bore until only said small fraction of the length of said pin protrudes from the end of said bore being not more than slightly greater than the axial force exerted on the pin when the tire in which the stud is mounted rolls on a road surface, whereby when the outer end of the shank of the stud wears down in use a predetermined amount at the pin end so as to decrease the axial length of the pin inside said bore, the said pin will move axially inwardly in said bore under the influence of the force exerted thereon by the road surface so as to control the protrusion of the pin from said outer end of said stud body, at least that portion of said body defining said bore being metal.

2. A tire stud according to claim 1 in which said bore is threaded to provide said peaks and valleys.

3. A tire stud according to claim 1 in which said bore is in the form of a series of substantially annular grooves and intervening ribs to provide said peaks and valleys.

4. A tire stud according to claim 1 in which said body is formed with a tubular central metal insert mounted therein on the axis thereof defining said bore, said insert having said peaks and valleys on at least the inside thereof.

5. A tire stud according to claim 4 in which said insert is formed with said peaks and valleys on the inside thereof prior to mounting the insert in said body.

6. A tire stud according to claim 4 in which said insert is corrugated in the axial direction.

7. A tire stud according to claim 4 in which said body comprises plastic material surrounding said insert and defining the profile of said body.

8. A tire stud according to claim 7 in which said plastic material is reinforced with high strength fibers.

9. A tire stud according to claim 8 in which said fibers are glass fibers.

10. A tire stud according to claim 7 in which said plastic material is Delrin.

* * * * *

UNITED STATES PATENT OFFICE
CERTIFICATE OF CORRECTION

Patent No. 3,747,659            Dated July 24, 1973

Inventor(s)     Rolf J. Cantz

It is certified that error appears in the above-identified patent and that said Letters Patent are hereby corrected as shown below:

On the cover sheet inventor's name "Rolf J. Caniz" should read -- Rolf J. Cantz --.

Signed and sealed this 25th day of December 1973.

(SEAL)
Attest:

EDWARD M. FLETCHER, JR.          RENE D. TEGTMEYER
Attesting Officer                Acting Commissioner of Patents